(12) United States Patent
Amaro et al.

(10) Patent No.: US 9,548,648 B2
(45) Date of Patent: Jan. 17, 2017

(54) SWITCHED REFERENCE MOSFET DRIVE ASSIST CIRCUIT

(71) Applicant: Texas Instruments Incorporated, Dallas, TX (US)

(72) Inventors: Michael G. Amaro, Naperville, IL (US); Joseph Maurice Khayat, Bedford, NH (US); Pradeep S. Shenoy, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 266 days.

(21) Appl. No.: 14/318,238

(22) Filed: Jun. 27, 2014

(65) Prior Publication Data

US 2015/0311792 A1  Oct. 29, 2015

Related U.S. Application Data

(60) Provisional application No. 61/984,611, filed on Apr. 25, 2014.

(51) Int. Cl.
  *H02M 3/158* (2006.01)
  *H02M 1/08* (2006.01)
  *H02M 3/07* (2006.01)

(52) U.S. Cl.
  CPC ............ *H02M 1/08* (2013.01); *H02M 3/1584* (2013.01); *H02M 3/1588* (2013.01); *H02M 3/07* (2013.01); *Y02B 70/1466* (2013.01)

(58) Field of Classification Search
  CPC .......... H02M 1/08; H02M 1/088; H02M 3/07; H02M 3/073; H02M 3/158; H02M 3/1582; H02M 3/1584; H02M 3/1588; H02M 2003/077

USPC ........ 323/234, 265, 268, 271; 307/109, 110, 307/112, 113, 115, 116; 327/536, 537; 363/59
See application file for complete search history.

(56) References Cited

U.S. PATENT DOCUMENTS

| | | | |
|---|---|---|---|
| 5,627,460 A * | 5/1997 | Bazinet | G05F 1/618 323/224 |
| 7,612,603 B1 * | 11/2009 | Petricek | H02M 3/07 307/109 |
| 7,696,735 B2 | 4/2010 | Oraw et al. | |

(Continued)

OTHER PUBLICATIONS

David Reusch, et al., "Three Level Buck Converter with Control and Soft Startup", Energy Conversion Congress and Exposition, 2009, ECCE 2009, IEEE, Sep. 20-24, 2009, San Jose, CA, pp. 31-35.

(Continued)

*Primary Examiner* — Jessica Han
*Assistant Examiner* — David A. Singh
(74) *Attorney, Agent, or Firm* — John R. Pessetto; Charles A. Brill; Frank D. Cimino

(57) ABSTRACT

A power converter includes at least a first phase including a high-side MOSFET transistor (HSA) and a low-side (LS) MOSFET transistor (LSA) driving a first output inductor. The first phase further includes an active gate drive assist circuit including first MOSFET switch (first switch) and second MOSFET switch (second switch) positioned in series between a source of HSA and a drain of LSA. A capacitor (CS) is between the source of HSA and drain of LSA. A bootstrap capacitor (CA) having a reference terminal is connected to a node between the first switch and the second switch.

13 Claims, 3 Drawing Sheets

(56) References Cited

U.S. PATENT DOCUMENTS

| | | | | |
|---|---|---|---|---|
| 8,427,113 B2* | 4/2013 | Xing | ..................... | H02J 7/0065 320/140 |
| 2006/0017466 A1* | 1/2006 | Bryson | ................. | H03F 3/2171 326/88 |
| 2007/0229047 A1 | 10/2007 | Sigamani et al. | | |
| 2008/0253151 A1* | 10/2008 | Bahramian | ............. | H02M 1/08 363/22 |
| 2010/0259233 A1* | 10/2010 | Cheng | ................. | H02M 3/1588 323/265 |
| 2011/0188218 A1* | 8/2011 | Hsing | ................. | H03K 17/687 361/772 |
| 2014/0021932 A1* | 1/2014 | Ejury | ....................... | G05F 3/02 323/311 |
| 2014/0198536 A1* | 7/2014 | Fu | ..................... | H02M 3/33546 363/17 |
| 2015/0077075 A1* | 3/2015 | Knoedgen | ............. | H02M 1/088 323/272 |
| 2015/0207401 A1* | 7/2015 | Zhang | ................. | H02M 3/158 323/271 |

OTHER PUBLICATIONS

K. Nishijima, et al., "Analysis of Double Step-Down Two-Phase Buck Converter for VRM", Twenty-Seventh International Telecommunications Conference, 2005, INTELEC 2005, Sep. 2005, Berlin, pp. 497-502.

\* cited by examiner

SWITCHED REFERENCE MOSFET DRIVE ASSIST CIRCUIT

CROSS REFERENCE TO RELATED APPLICATIONS

This application claims the benefit of Provisional Application Ser. No. 61/984,611 entitled "A Switched Reference MOSFET Drive Circuit and Methodology", filed Apr. 25, 2014, which is herein incorporated by reference in its entirety.

FIELD

Disclosed embodiments relate to power converters having boost capacitors and structures for charging the bootstrap capacitor associated with a high-side MOSFET for converter topologies that lack a common connection node between the high-side MOSFET and the low-side MOSFET.

BACKGROUND

Some non-isolated buck power conversion topologies have been developed to enable higher power conversion ratios which include bootstrap capacitors that provide the per-cycle charge needed to turn ON the high-side (HS) MOSFET of the half-bridge power switches. An example is termed a "switch-capacitor buck" topology, where the conventional common connection node between the source of the HS MOSFET and the drain of the low-side (LS) MOSFET, sometimes termed the "switch" node or "phase" node, no longer exists rendering the conventional bootstrap capacitor-based method of enhancing the performance of the HS MOSFET not possible. One known solution to this challenge is to add a voltage source which provides a voltage level that dynamically varies with operating conditions for charging the HS of the bootstrap capacitor.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include a switched reference gate drive assist circuit (gate drive assist circuit) and methodologies configured to provide a higher enhancement voltage for a power converter including a high-side (HS) enhancement mode MOSFET switch (HS MOSFET) and a low-side (LS) enhancement mode MOSFET switch (LS MOSFET), where the source of the HS MOSFET is not directly connected to the drain of the LS MOSFET. Disclosed gate drive assist circuits enable the gate of the HS MOSFET to be provided a voltage that is above the highest voltage used in the power conversion application (e.g., the input voltage, Vin) when needed to be ON to ensure proper converter operation. For example, in the switched-capacitor topology, due to intervening circuitry, the source of the HS MOSFET is not directly connected to the drain of the LS MOSFET.

Disclosed converters include single phase converters (only a first phase) defined herein as the number of output inductors included in the power converter. Other embodiments include a first phase and a second phase, such as a first half-bridge and a second half-bridge each having their own output inductor. The first phase includes at least one extra energy storage capacitor connected between the source of HS MOSFET and the drain of the LS MOSFET. The gate drive assist circuit actively controls the reference terminal of the bootstrap capacitor as a function of the ON-state of HS MOSFET and the ON-state of the LS MOSFET. This arrangement allows the voltage source coupled to the HS of the bootstrap capacitor to be independent of operating conditions and still allows proper operation of the HS MOSFET which can be compared to known solutions which add a voltage source that varies with operating conditions for charging the HS (positive terminal) of the bootstrap capacitor.

BRIEF DESCRIPTION OF THE DRAWINGS

Reference will now be made to the accompanying drawings, which are not necessarily drawn to scale, wherein.

DETAILED DESCRIPTION

Figure 1:
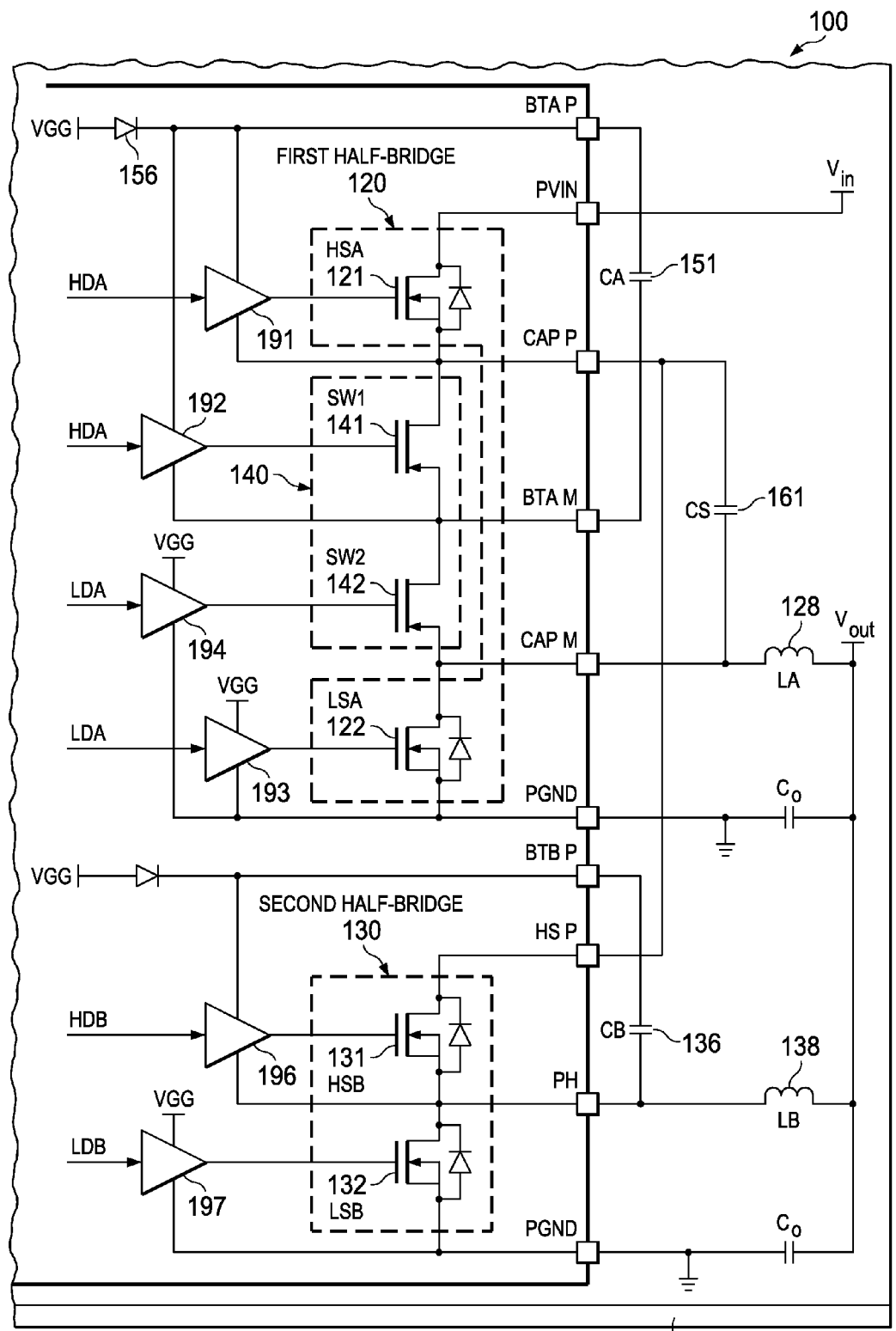
FIG. 1 shows an example switched-capacitor converter (converter) including a first half-bridge and second half-bridge and a gate drive assist circuit in the first half-bridge to enable boosting the gate-to-source voltage of the HS phase A MOSFET switch (HSA) in the first half-bridge above the highest voltage used in the converter application to improve switching performance, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 shows an example switched-capacitor buck converter (converter) 100 including a first half-bridge 120 and second half-bridge 130, and a gate drive assist circuit 140 according to an example embodiment. Gate drive assist circuit 140 provides charging of the reference side of the bootstrap capacitor (CA) 151 in first half-bridge 120 to enable boosting the gate-to-source voltage of HSA 121 in the first half-bridge 120 above the highest voltage used in the converter application (e.g., Vin shown coupled to the drain of HSA 121) to its improve switching performance. The output of converter 100 is shown as Vout.

Although described generally for buck converters, disclosed embodiments may also be applied to boost converters. The converter 100 is shown in FIG. 1 as a monolithic converter formed in and on a substrate 105. However, disclosed embodiments include a plurality of discrete devices. Although not shown in FIG. 1, the converter 100 may also include control logic in addition to the gate drive circuitry including buffers 191, 192, 193, 194, 196 and 197, shown formed in and on the substrate 105.

In FIG. 1, the gate drive circuitry shown includes a first buffer 191 having an output coupled to a gate of HSA 121, a second buffer 192 having an output coupled to a gate of the first switch (SW1) 141, a third buffer 193 having an output coupled to a gate of LSA 122, a fourth buffer 194 having an output coupled to a gate of the second switch (SW2) 142. A high side (positive) terminal of CA 151 is shown connected to a positive supply of the first buffer 191 and to a positive supply of the second buffer 192. The positive supply of the third buffer 193 and positive supply of the further buffer 194 are both shown connected to VGG. The positive supply of buffer 196 and 197 of the second half-bridge 130 are shown connected to VGG, with the positive supply of buffer 197 shown directly connected to VGG and the positive supply of buffer 196 shown connected to VGG through the diode shown.

In operation of converter 100, a first correlated input signal shown as HDA is coupled to an input of the first buffer 191 and to an input of the second buffer 192, and a second correlated input signal shown as LDA is shown coupled to an input of the third buffer 193 and to an input of the fourth buffer 194. This arrangement allows HSA 121 and SW1 141 to be turned ON and OFF at about the same time, and LSA 122 and SW2 142 to be to be turned ON and OFF at about the same time. In the second half-bridge 130, buffer 196 receives an input shown as HDB that is coupled to a gate of HSB 131, and a buffer 197 that receives an input shown as LDB that is coupled to a gate of LSB 132.

Series capacitor buck converter 100 is shown as a monolithic integrated circuit (IC) that is formed in and on a substrate 105, such as a silicon comprising substrate including bulk silicon or silicon epi on a bulk silicon substrate. The substrate 105 can also generally comprise other materials, such as elementary semiconductors besides silicon including germanium. Substrate 105 may also generally comprise a compound semiconductor such as silicon carbide, gallium arsenide, indium arsenide, or indium phosphide. Moreover, substrate 105 may also generally comprise an alloy semiconductor such as silicon germanium, silicon germanium carbide, gallium arsenic phosphide, and gallium indium phosphide. Although not shown for simplicity to avoid obscuring inventive details, control logic can also be formed on the substrate 105 for driving the inputs of the respective buffers.

The second half-bridge 130 includes a HS phase B MOSFET switch (HSB 131), and a LS phase B MOSFET switch 132 (LSB 132). The power switches HSA 121, LSA 122, HSB 131 and LSB 132 are all enhancement mode devices, and are shown as n-channel MOSFET devices conventionally configured having their body diodes parallel to their source-to-drain path by shorting the source to the body of the MOSFET.

As noted above, the gate drive assist circuit 140 includes at least a first MOSFET switch shown as SW1 141 and a second MOSFET switch shown as SW2 142, which results in the source of HSA 121 not being directly connected to the drain of the LSA 122. SW1 141 is matched in voltage rating (i.e., voltage blocking when OFF) to HSA 121 and SW2 142 is matched in voltage rating relative to LSA 122. Disclosed embodiments recognize HSA 121 needs a gate drive enhancement to a voltage above the highest voltage used in the power conversion application (typically Vin) for proper converter operation, and provides enhanced charging of the reference terminal of CA 151 to ensure proper turn ON of HSA 121 when desired.

HSB 131 and LSB 132 of the second half-bridge 130 provide a conventional half-bridge configuration where a common connection at the PH node exists between the source of HSB 131 and drain of LSB 132 with the bootstrap capacitor for HSB 131 shown as CB 136, referenced to the PH node. However, unlike second half-bridge 130, the first half-bridge comprise a modified half-bridge where because of the gate drive assist circuit 140 a common connection no longer exists between HSA 121 and LSA 122, which is recognized herein as necessitating an alternative method for charging CA 151. A circuit modification disclosed in converter 100 in FIG. 1 is the addition of at least one extra energy storage capacitor shown in FIG. 1 labeled as CS 161 connected between the source of HSA 121 and the drain of LSA 122.

In order to enhance the gate-to-source voltage of HSA 121 to a sufficient voltage for efficient turn ON, being >Vin, it is recognized it is needed to charge CA 151 with the correct voltage during the OFF-state of HSA 121 and elevate the voltage of the reference side of CA 151 to the correct potential during the intended ON-state of HSA 121. This voltage enhancement cannot be accomplished as recognized herein by simply connecting the reference side of CA 151 to the phase A inductor La 128, thus needing a new circuit design reflected in the phase A circuitry for converter 100.

The gate drive assist circuit 140 in the phase A circuitry of converter 100 controls the reference (negative) terminal of CA 151 shown as BTA.M in FIG. 1, where the gate drive assist circuit 140 permits active control of the reference point of CA 151 as a function of the ON-state of HSA 121 and LSA 122. Gate drive assist circuit's 140 control of the reference terminal of CA 151 enables boosting the gate-to-source voltage of HSA 121 to a sufficient level (e.g., >Vin) ensure an ON-state of HSA 121 when desired.

Regarding operation of the gate drive assist circuit 140, converter 100 is configured so that SW1 141 of the gate drive circuit 140 and HSA 121 receive correlated gate drive signals, shown as both receiving HDA, and converter 100 is configured so that SW2 142 and LSA 122 receive correlated gate drive signals, shown as both receiving LDA. Accordingly, when LSA 122 is turned ON, SW2 142 is also turned ON forcing the reference terminal (BTA.M) of CA 151 to the ON-state voltage across LSA 122. This ON-state voltage level is a near-zero voltage due the source of LSA 122 being referenced to the power ground (shown as PGND). During the ON-state of LSA 122, CA 151 is then charged to the voltage present on the VGG pin less any drops resulting from other series elements including the diode 156 shown. It is this action that forces a predictable voltage across CA 151 which allows the first half-bridge 120 despite lacking a common node between HSA 121 and LSA 122 to mirror the behavior of the conventional second half-bridge 130 where its bootstrap capacitor CB 136 can be simply charged through the ON-state of LSB 132.

When LSA 122 is turned OFF, SW2 142 is also turned OFF. This action leaves the reference side of CA 151 floating until SW1 141 is turned ON which can be coincident with or just prior to HSA 121 by being turned on by the second buffer 192 shown receiving an HDA input. When SW1 141 is ON the reference side (BTA.M) of CA 151 is forced to be at the same potential as the source of HSA 121. This ideally creates a constant voltage greater than Vin (coupled to the drain of HSA 121), independent of Vin and independent of the voltage across CS 161, to be used as gate bias for the controlled enhancement of the turn ON of HSA 121. This circuit topology and synchronized (not necessarily simultaneous) behavior of SW1 141 and SW2 142 to the HSA 121 and LSA 122, respectively, in the first half-bridge 120 thus enables generating a predictable voltage, in this case a voltage level close to VGG (shown as VGG minus (−) a forward diode drop across diode 156) to be used as a controlled enhancement voltage for the gate of HSA 121 that is above Vin.

In order to understand the behavior of disclosed gate drive assist circuit 140, it is recognized that the drain of the LSA 122 can no longer be used as the reference for CA 151 during the ON-state of the HSA 121 since this voltage will be less than the intended source voltage of HSA 121, typically nearly Vin. In one example embodiment, VGG is 5V and Vin is 12V. For converter 100, the drain of the LSA 122 (shown in FIG. 1 as node CAP.M) switches between near-zero volts when LSA 122 is ON, and about one-half Vin when HSA 121 ON (and when LSA 122 is OFF) under steady state conditions. As such, without gate drive assist circuit 140, CA 151 would be referenced to node CAP.M, so that CA 151 would only provide a voltage about equal to VGG+Vin/2 which, under some operating conditions, is recognized to not be sufficient to ensure the turn ON HSA 121.

Figure 2:
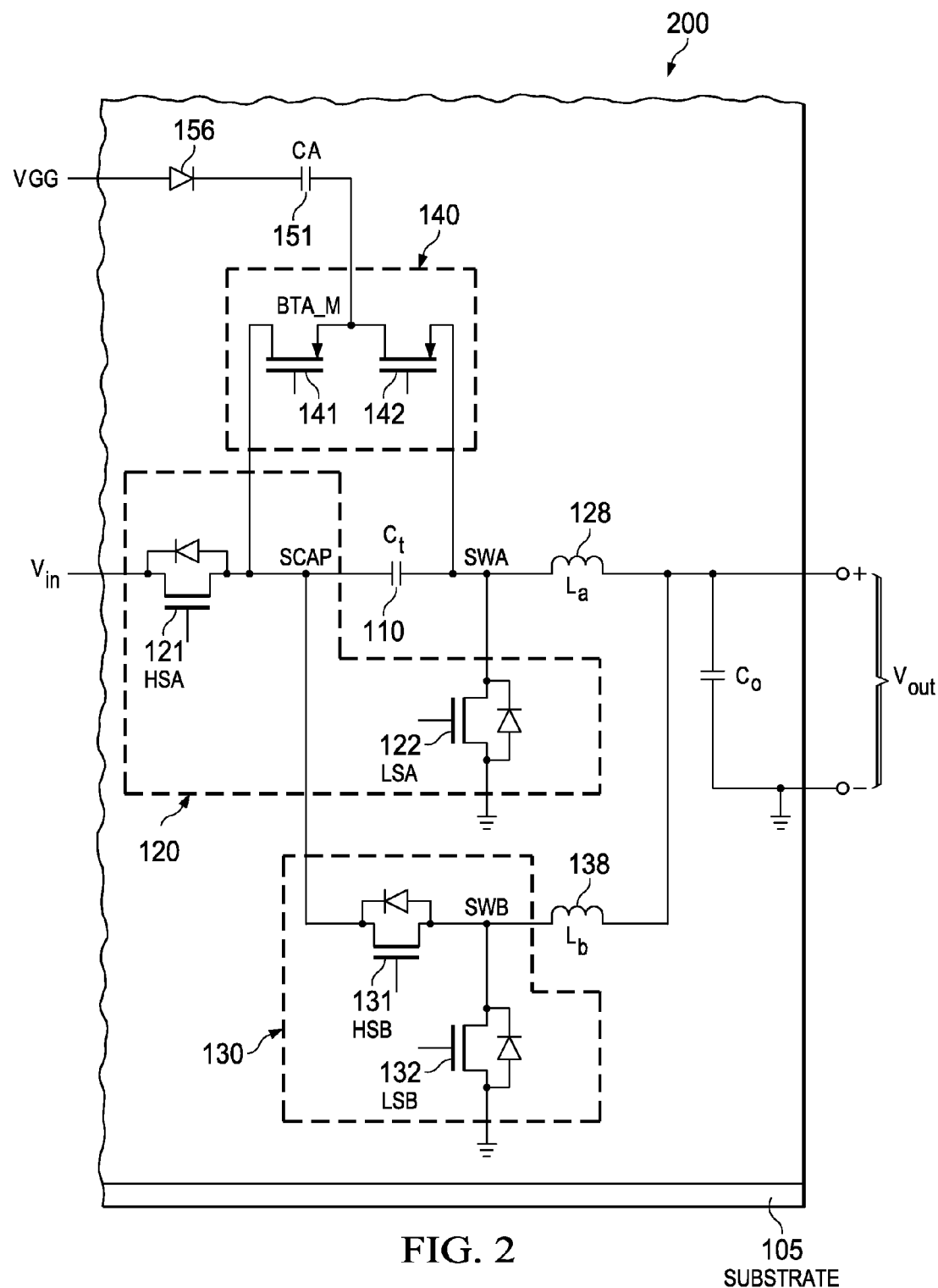
FIG. 2 shows an example monolithic series capacitor buck converter that includes a transfer capacitor (Ct) in series in a first half-bridge circuit and between the first half-bridge circuit and a second half-bridge circuit, and a disclosed gate drive assist circuit, according to an example embodiment.

FIG. 2 shows an example monolithic series capacitor buck converter 200 that includes a transfer capacitor (Ct) 110 in series in a first half-bridge circuit 120 and between the first half-bridge circuit 120 and a second half-bridge circuit 130, and a gate drive assist circuit 140 parallel to Ct 110, according to an example embodiment. Gate drive circuitry (e.g., buffers 191, 192, 193, 194, 196 and 197) is not shown in FIG. 2 for simplicity but is configured so that the series capacitor buck converter 200 including its gate drive assist circuit 140 functions as described above for converter 100. Series capacitor buck converter 200 merges a switched capacitor converter and a buck converter. Ct 110 performs the same function of the extra energy storage capacitor shown in FIG. 1 labeled as CS 161, so that no additional energy storage capacitor (CS 161 as shown in FIG. 1) is needed for series capacitor buck converter 200.

Ct 110 is shown positioned between the nodes identified in FIG. 1 as SCAP (series Capacitor) and SWA. Being in series in first half-bridge circuit 120, during steady-state operation of the series capacitor buck converter 200, Ct 110 holds charge and the voltage is close to half the input supply voltage, Vin, that powers the series capacitor buck converter 200. A typical capacitance range for Ct 110 is 0.1 µF to 10 µF.

Ct 110 can be a monolithic capacitor integrated on the same substrate 105 as the MOSFET power switches (HSA 121, LSA 122, HSB 131, LSB 132) in a technology that offers ultra-high density monolithic capacitors. A monolithic capacitor is defined in the art and defined herein to be a capacitor in which the layers of electrodes and dielectric(s) are bonded together in a unitary structure as opposed, for example, to a metallized film capacitor in which self-supporting films are rolled or wound into the capacitor form. The monolithic capacitor can comprise a multi-layer chip capacitor (sometimes labeled MLCCs), that are known to provide high density ceramic capacitors.

Addition of Ct 110 as shown provides a reduced drain-to-source voltage (Vds) leading to less switching loss and ability to utilize lower VDS breakdown power switches such as for certain power FETs for the LSA 122 and LSB 132 in the series capacitor buck converter 200 which may have a breakdown voltage <Vin. Moreover, the addition of Ct 110 as shown provides inherent phase current balancing and an extended duty ratio.

Unlike conventional converters, for series capacitor buck converter 200 Vin is coupled to only the drain of HSA 121. The bootstrap capacitor for HSA 121 is shown as CA 151. The reference (negative) terminal of CA 151 as in converter 100 shown in FIG. 1 is connected to the BTA_M node which is between SW1 141 and SW2 142. The second half-bridge circuit 130 includes HSB 131 in series with LSB 132 that drives a second output inductor 138.

Figure 3:
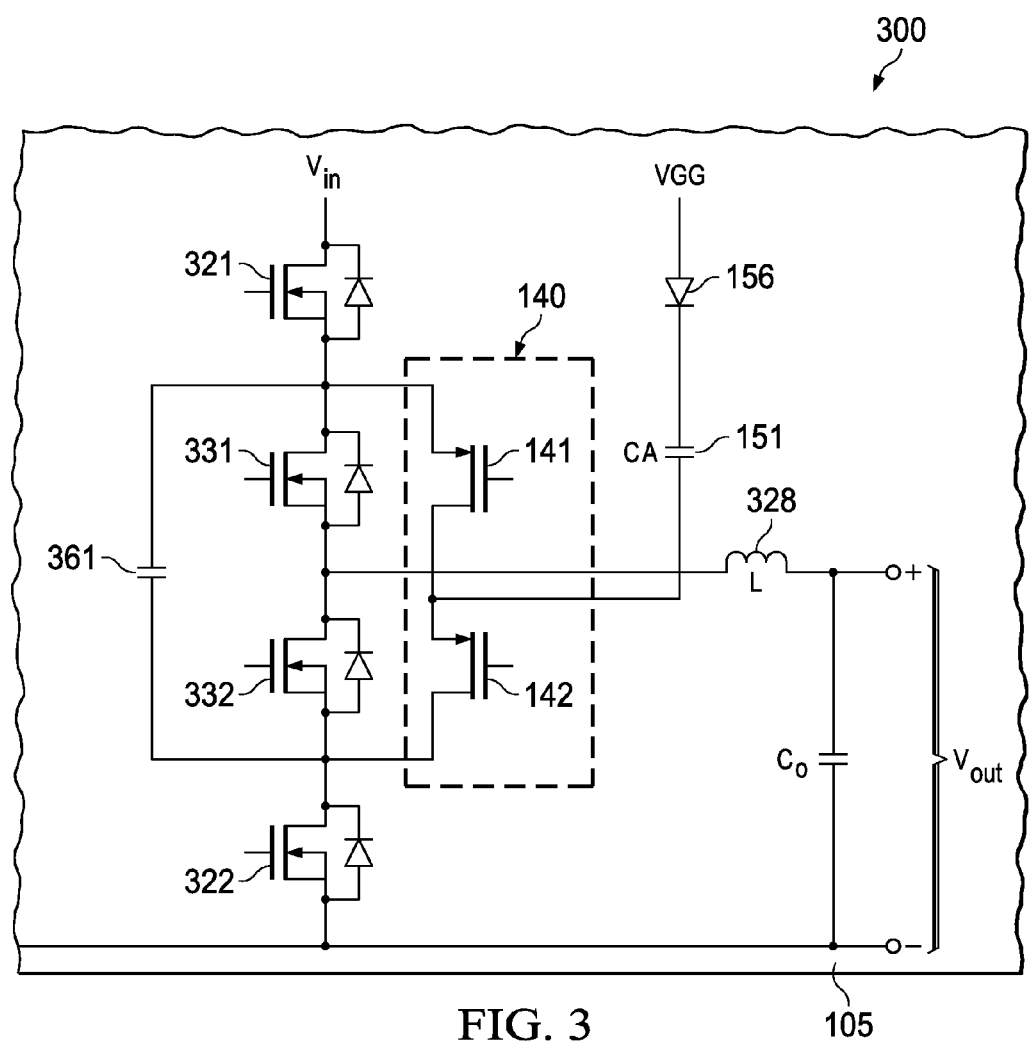
FIG. 3 shows a single phase three-level converter including a disclosed gate drive assist circuit, according to an example embodiment.

FIG. 3 shows three-level converter 300 including an example gate drive assist circuit 140, according to an example embodiment. Three-level converter 300 has a single inductor 328 and is thus an example of a single-phase converter having a disclosed gate drive assist circuit 140. Three-level converter 300 includes a HS MOSFET transistor 321 and a low side MOSFET transistor 322, with intervening circuitry between the source of the HS MOSFET transistor 321 and the drain of the LS MOSFET transistor 322 shown as a third MOSFET switch 331 connected in series with a fourth MOSFET switch 332.

A capacitor 361 is shown between the source of the HS MOSFET transistor 321 and the drain of the LS MOSFET transistor 322. The gate drive assist circuit 140 is between the HS MOSFET transistor 321 and LS MOSFET transistor 322 and the CA 151 is connected in between the gate drive assist circuit 140 as it is for converter 100 shown in FIG. 1 and series capacitor buck converter 200 shown in FIG. 2. Gate drive circuitry (e.g., buffers 191, 192, 193, 194, 196 and 197 in FIG. 1) is not shown in FIG. 3 for simplicity but is configured so that the three-level converter 300 including its gate drive assist circuit 140 functions as described above for converter 100. In operation, the three-level converter 300 has a timing diagram similar to that of the traditional two-phase buck converter where the HS MOSFET transistor 321 and third MOSFET switch 331 are driven 180° out of phase and the LS MOSFET transistor 322 and fourth MOSFET switch 332 are driven complimentary to the HS MOSFET transistor 321 and third MOSFET switch 331, respectively.

Disclosed embodiments are distinct from other solutions for charging the bootstrap capacitor (CA) 151 to enhance the turning ON of the HS power switch which typically add a voltage source that varies with operating conditions to be used to charge the bootstrap capacitor. Disclosed embodiments provide the advantage of allowing the voltage source for charging the bootstrap capacitor, VGG as shown, to be a fixed supply thus being independent of operating conditions while still be able to provide the gate of HSA a voltage >Vin to ensure proper operation (reliably turn ON of the HS power switch without the use of a charge pump), which enables simplification of the gate driver circuitry.

Advantages of disclosed embodiments thus provide an efficient method to control the enhancement voltage required for reliably turning ON a HS MOSFET in any converter topology where the HS MOSFET source is not directly connected to the drain of the LS MOSFET and the HS MOSFET needs enhancement above the highest voltage used in the power conversion application. For example, as disclosed above, the switched-capacitor topology (shown in FIG. 1), series capacitor buck converter (shown in FIG. 2), and three-level converter topology (shown in FIG. 3), can each benefit from disclosed embodiments.

Disclosed embodiments can be used to form semiconductor die and semiconductor devices that may be integrated into a variety of assembly flows to form a variety of different devices and related products. The semiconductor die may include various elements therein and/or layers thereon, including barrier layers, dielectric layers, device structures, active elements and passive elements including source regions, drain regions, bit lines, bases, emitters, collectors, conductive lines, conductive vias, etc. Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A power converter, comprising:
at least a first phase including a high-side (HS) MOSFET transistor (HSA) and a low-side (LS) MOSFET transistor (LSA) driving a first output inductor;
wherein said first phase further comprises:
a gate drive assist circuit including a first MOSFET switch (first switch) and a second MOSFET switch (second switch) positioned in series between a source of said HSA and a drain of said LSA;
at least one capacitor (CS) between said source of said HSA and said drain of said LSA, and
a bootstrap capacitor (CA) having a reference terminal connected to a node between said first switch and said second switch.

2. The power converter of claim 1, wherein said HSA and said LSA are configured as a first half-bridge circuit, and said power converter further comprises a second half-bridge circuit including a HS MOSFET transistor (HSB) in series with a LS MOSFET transistor (LSB) driving a second output inductor.

3. The power converter of claim 2, wherein said power converter is configured as a series capacitor buck converter that includes said capacitor CS as a transfer capacitor (Ct) in between said first half-bridge circuit and said second half-bridge circuit.

4. The power converter of claim 1, wherein said power converter is configured as a three-level converter further comprising a third MOSFET switch connected in series with a fourth MOSFET switch in parallel to said active gate drive assist circuit and said CA.

5. The power converter of claim 1, further comprising a gate driver including a first buffer having an output coupled to a gate of said HSA, a second buffer having an output coupled to a gate of said first switch, a third buffer having an output coupled to a gate of said LSA, a fourth buffer having an output coupled to a gate of said second switch, wherein a high side terminal of said CA is connected to a positive supply of said first buffer and to a positive supply of said second buffer.

6. The power converter of claim 5, wherein when an input voltage (Vin) is coupled to a drain of said HSA, and when said LSA is OFF said gate drive assist circuit together with said CA biases said positive supply of said first buffer so that said gate of said HSA is provided a voltage above said Vin.

7. A method of operating a power converter, comprising:
providing said power converter at least a first phase including a high-side (HS) MOSFET transistor (HSA) and a low-side (LS) MOSFET transistor (LSA) driving a first output inductor, wherein said first phase further comprises an active gate drive assist circuit including a first MOSFET switch (first switch) and a second MOSFET switch (second switch) switch positioned in series between a source of said HSA and a drain of said LSA, at least one capacitor (CS) between said source of said HSA and said drain of said LSA, and a bootstrap capacitor (CA) having a reference terminal connected to a node between said first switch and said second switch,
biasing a HS terminal of said bootstrap capacitor (CA) to a fixed potential, and
actively controlling a potential on a reference terminal of said CA as a function of an ON-state of said HSA and an ON-state of said LSA.

8. The method of claim 7, wherein said actively controlling comprises:
wherein when said LSA is turned ON, forcing said reference terminal to an ON-state voltage across said LSA so that CA is then charged to said fixed potential minus voltage drops resulting from any series elements present in series with said HS terminal of said CA, and
wherein when said LSA is turned OFF, forcing said reference terminal of said CA to be at a same potential as said source of said HSA.

9. The method of claim 7, wherein said power converter further comprises a gate driver including a first buffer having an output coupled to a gate of said HSA, a second buffer having an output coupled to a gate of said first switch, a third buffer having an output coupled to a gate of said LSA, a fourth buffer having an output coupled to a gate of said second switch, wherein a high side terminal of said CA is connected to a positive supply of said first buffer and to a positive supply of said second buffer,
further comprising providing a first correlated input signal to an input of said first buffer and an input of said second buffer, and a second correlated input signal to an input of said third buffer and to an input of said fourth buffer.

10. The method of claim 9, wherein when an input voltage (Vin) is coupled to a drain of said HSA, and when said LSA is OFF said gate drive assist circuit together with said CA biases said positive supply of said first buffer so that said gate of said HSA is provided a voltage above said Vin.

11. The method of claim 7, wherein said HSA and said LSA is configured as a first half-bridge circuit, and said power converter further comprises a second half-bridge circuit including a HS MOSFET transistor (HSB) in series with a LS MOSFET transistor (LSB) driving a second output inductor.

12. The method of claim 10, wherein said power converter is configured as a series capacitor buck converter that includes said capacitor as a transfer capacitor (Ct) 110 in between said first half-bridge circuit and said second half-bridge circuit.

13. The method of claim 7, wherein said power converter is configured as a three-level converter further comprising a third MOSFET switch connected in series with a fourth MOSFET switch in parallel to said active gate drive assist circuit and said CA.

* * * * *